Sept. 23, 1930.  A. C. MORRISSON  1,776,322
GRILL
Filed May 8, 1929  2 Sheets-Sheet 2
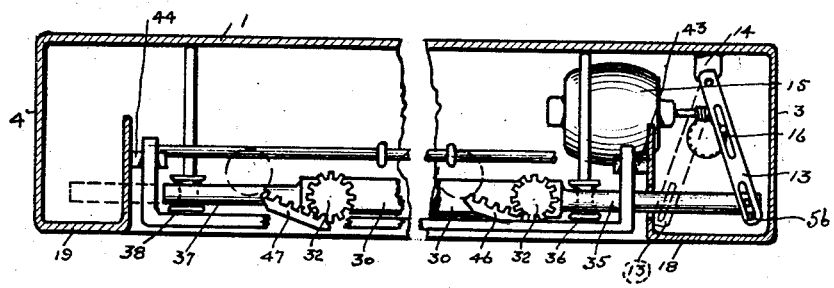
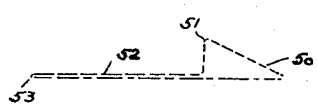
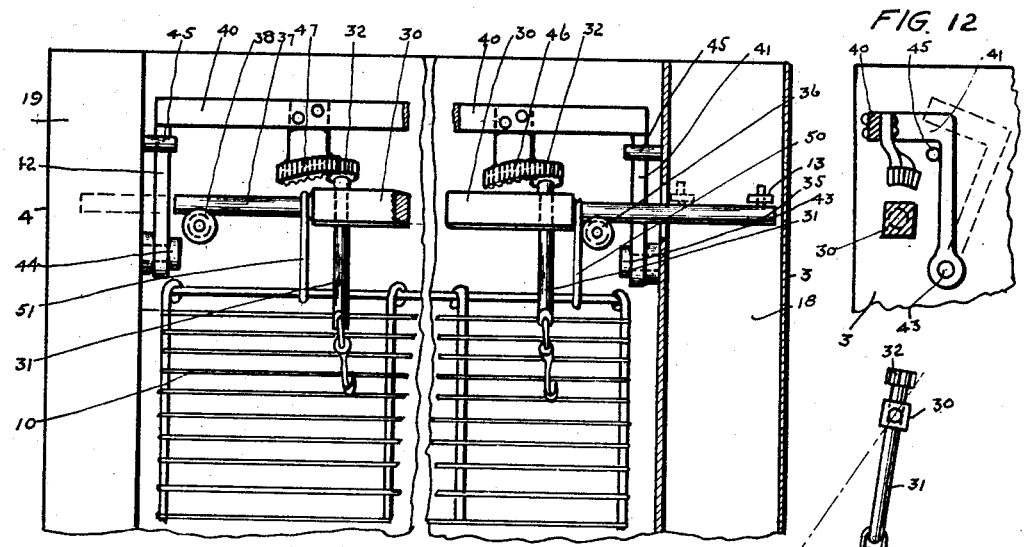
INVENTOR.
Albert C. Morrisson
BY George J. Henry
ATTORNEY.

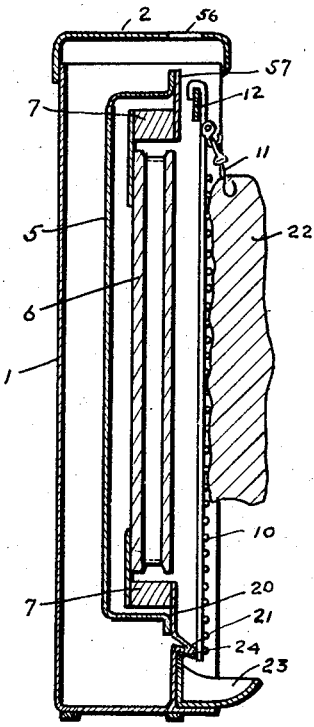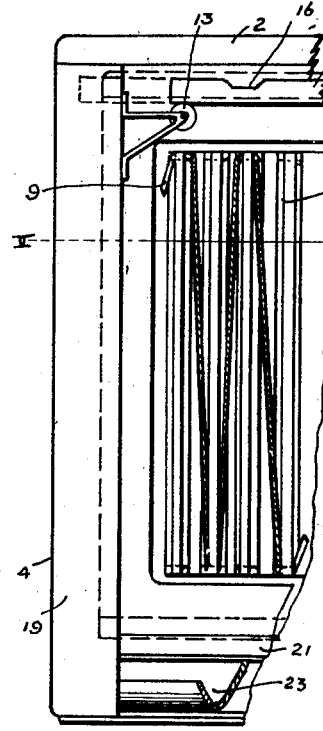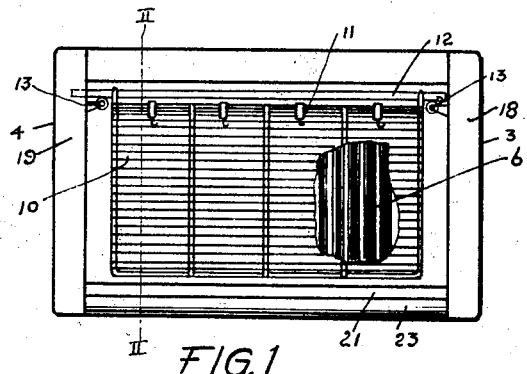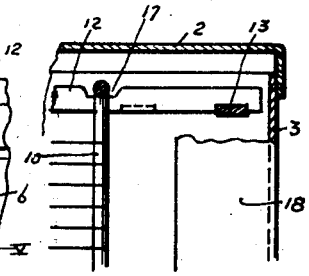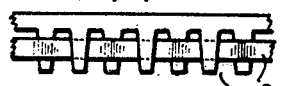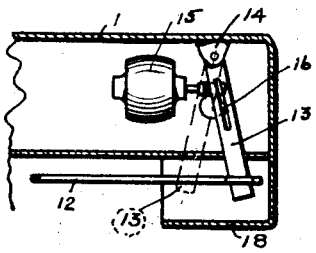

Patented Sept. 23, 1930

1,776,322

UNITED STATES PATENT OFFICE

ALBERT C. MORRISSON, OF SAN FRANCISCO, CALIFORNIA

GRILL

Application filed May 8, 1929. Serial No. 361,429.

My invention has for its object a grill for broiling meats and the like in a most sanitary and efficient manner, and particularly a grill of the character described electrically operated and wherein the meat being broiled is moved in front of the heat element.

In a specific form of my invention the meat is automatically turned, thus preventing the necessity of handling it with the fingers, reducing the labor involved, and making the action automatic from the time the meat is placed in the grill until the cooking is completed.

Other objects will appear from the specification and drawings which follow:

These objects I attain by providing an electric heating element which provides a substantially plane heating zone and within which zone is provided supporting means for the meat or other food product to be grilled.

This supporting means is oscillated or otherwise moved in the plane of the heat zone to prevent burning and to equalize the cooking over the various portions of the meat surface.

From time to time the meat is turned as may be required to insure cooking on both sides. This turning may be accomplished manually or in another form of my apparatus it may be turned automatically.

Fig. 1 shows a front view of one form of my invention with the screen or grill frame shown broken away, and with the heating element exposed therebehind.

Fig. 2 is an enlarged cross section of Fig. 1 on the line II—II thereof.

Fig. 3 is an enlarged fragmentary portion of the left hand side of the grill of Fig. 1.

Fig. 4 is an enlarged detailed of the upper right hand corner of the grill of Fig. 1, to better illustrate the operating connections for causing the movement of the meat.

Fig. 5 is a cross section of the electrical element of Fig. 3 on the line V—V thereof.

Fig. 6 is a fragmentary plan view of a portion of the electrical element.

Fig. 7 is a plan view of Fig. 4 with the top removed to show the operating connections for oscillating the screen.

Figs. 8 and 9 are a front view of the upper right hand and upper left hand portions of a modified form of my apparatus and illustrating particularly the operating connnections for turning the meat.

Figs. 10 and 11 are plan views of Figs. 8 and 9 and with the cover removed to show the operating parts.

Fig. 12 is a detail of the supporting bar suspension and operating mechanism.

Fig. 13 is a detail of one of the spindles adapted to support and to turn a steak or the like while being cooked.

Fig. 14 is a diagrammatic showing of the path of movement of the pinion 32 during any single cycle of operation.

Throughout the figures similar numerals refer to identical parts.

The numeral 1 represents a housing having a top 2, with a vent opening 56, and sides 3, 4, respectively, within which housing is supported a back 5, for the heating element and spaced from the rear housing 1.

At 6 is an electric heating element preferably heat insulated as by the members 7, 7, from the other portions of the back and the housing and supported from the plates 20 and 57, extending from the sides 3 and 4.

The heating element 6 is formed of any suitable insulating material such as any of the numerous vitreous products generally employed for this purpose, and having grooves 8 enabling the metallic resistance strip 9 to be weaved over and under the successive projecting ends of strips of the vitreous material between the spaces 8, thus forming a continuous resistance element within the grooved portions of the vitreous material.

The heating of this resistance element by an electric current produces a relatively flat heat or cooking zone in front of the said element.

At 10 is a grill screen against which the food product 22, to be cooked is normally suspended, as by the swivel hook 11, supported from the upper part of the screen 10.

The screen 10 is supported on the rod 12 and the rod 12 is carried upon rollers or other suitable carrying means 13, 13.

On the opposite end of the rod 12 is provided a recess engaging upon the lever 13, which lever is pivotally mounted at 14, and is oscillated by the motor 15, through conventional connections and the pin and slot at 16, so that the lever 13 has an oscillating movement from the full line position to the dotted line position of Fig. 7.

I prefer to hook the screen 11 over the rod 12 and in engagement with the slots 16, 17.

The front portion of the device is provided with the right hand pocket 18 and the left hand pocket 19 to form an edging preferably projecting beyond the heat zone; and within the pocket 18 one end of the rod 12 oscillates, whereas the other end of the said rod projects into the pocket 19.

Particular attention is directed to the front plate 20 which may be formed as a part of the housing 1, and having a depending apron 21 as best shown in Fig. 2.

The screen 10 has slidable engagement against the apron 21, and as the screen is supported from the rod 12, the center of gravity of the screen and the meat 22 being cooked in front of the heating element, will lie to the right of the edge of the apron 21 and consequently the screen 10 will slide against the edge of the apron and any grease or drippings will collect and drip from the edge of the apron and the lower portion of the screen and the meat into the removable pan 23.

The pan 23 is formed at 24, with an upstanding back portion engaging under the overhanging apron 21 so that it is retained in position at all times by the said apron, unless it is lifted up and out as for the purpose of cleaning.

In a modified form of the apparatus, the oscillating rod is shown at 30 and through this rod project a plurality of meat supporting spindles 31, 31, rotatively mounted in the rod.

On the upper ends of these spindles are mounted pinions 32 and on the lower end hooks 33. One end of the rod 30 projects within the pocket 18 and there engages the lever 13 and is oscillated by the operation of the motor 15 as previously described, the slot 56, being sufficiently long, or any conventional form of swivel connection being provided between the end 35 of the rod 30, and the lever 13, to permit the turning of the rod through substantially 45° during its oscillating cycle, that is from the full line position 31, to the dotted position 55, of Fig. 13.

At 36 is a supporting roller for the end 35 which latter is of circular cross section while the body portion 30 is shown square.

The opposite end of the rod 37 is also circular and is supported by the roller 38 and during the oscillating movement this end passes freely within the pocket 19.

Longitudinally mounted adjacent to the rod 30 is the movable bar 40 which has depending lever ends 41, 42 respectively, which latter are pivoted at 43, 44, the pivots 43, 44 being displaced with respect to the center of gravity of the bar, so that the bar will tend to return by gravity to the full line position of Fig. 12, whenever it is displaced therefrom, or a spring or weight means may be employed if preferred, to insure the returning of the bar 40 to its full line position against the pin 45.

Depending from the bar 40 are the skew racks 46, 47, adapted to engage and to rotate through 180° the pinions 32, 32 during a portion of the oscillating movement.

In the form of my apparatus shown in Figs. 8 and 9, the screen 10 may be suspended from the rod 30, by the hooks 50, 51, and caused to oscillate with the meat; or it may be fixed to the inner faces of the pockets 18, 19 and remain stationary while the bar 30, and the meat only oscillate, if preferred.

The operation is as follows:

The motor 15 oscillates the lever 13; which in turn oscillates the rod 30 carrying with it the pinions 32. The range of oscillation may be made anything desired and is preferably such that the pinions 32 engage the racks 46, 47 only during a portion of their oscillating movement. During such time as the pinions 32, 32, engage under the racks 46 and 47, they are forced to rotate the spindles 31 through 180° of movement, the pinions being forced, due to the angular shape of the racks, to partially rotate the rod 30 and spindles 31 through substantially 45° of movement. This rotation causes the spindles 31 to advance outward in an angular position substantially 45° to the face of the screen 10, swinging the meat carried upon the hooks 33 and at the same time turning it over, see also Fig. 13.

When the pinions have left the racks the weight of the meat pulls the spindles 31 down until the opposite face of the meat contacts again with the screen 10.

The rod 30 continues its movement to the end of the stroke and then returns, and as it returns the pinions approaching the inner sloping face of the racks push the racks and bar 40 from the full line position to the dotted line position of Fig. 12, thus allowing the pinions to clear the racks and until the pinions arrive at the extreme right of their cycle of movement, see Fig. 14.

As the oscillating movement now proceeds in the opposite direction, the pinion engages the racks, which, being held against the pin 45, force the pinions to travel along the rack teeth and perform their turning movement as above described during which they follow the portion 50 of the cycle of movement path in Fig. 14.

When they arrive at the end of the racks the weight of the meat as before, pulls them from the position 51 into the straight line position of movement 52. The movement reverses at the position 53 and the pinions return to the position 50 and a cycle of oscillation has been completed—see Fig. 14.

I claim:

1. In a grill a housing and a heating element having a substantially vertical plane face, a bar above said element and motor means and connections oscillating said bar, hooks depending from said bar adapted to support meat or the like in front of and spaced from said element.

2. In a grill a housing and a heating element having a substantially vertical plane face, a bar above said element and motor means and connections oscillating said bar, hooks and a swivel connection to and depending from said bar adapted to support meat or the like in front of and spaced from said element and a screen between said face and said meat.

3. In a grill a housing and a heating element having a substantially vertical plane face, a bar above said element and motor means and connections oscillating said bar, hooks depending from said bar adapted to support meat or the like in front of and spaced from said element, a depending apron extending below and in front of said face and a drip pan engaging under said apron and extending forward of said meat.

4. In a grill a housing and a heating element having a substantially vertical plane face, a bar above said element and motor means and connections oscillating said bar, hooks and a swivel connection to and depending from said bar adapted to support meat or the like in front of and spaced from said element and a screen between said face and said meat, a depending apron extending below and in front of said face and a drip pan engaging under said apron and extending forward of said meat.

5. In combination with apparatus as set forth in claim 1, means for partially rotating said bar during said oscillation movement, and a plurality of spindles rotatable in said bar and projecting therebelow and having said hooks on their lower ends and other means adapted to turn said spindles, said hooks and said meat when said bar is partially rotated whereby said meat cooks first on one side and then on the other.

6. In combination with apparatus as set forth in claim 2, means for partially rotating said bar during said oscillation movement, and a plurality of spindles rotatable in said bar and projecting therebelow and having said hooks on their lower ends and other means adapted to turn said spindles, said hooks and said meat when said bar is partially rotated whereby said meat cooks first on one side and then on the other.

7. In combination with apparatus as set forth in claim 3, means for partially rotating said bar during said oscillation movement, and a plurality of spindles rotatable in said bar and projecting therebelow and having said hooks on their lower ends and other means adapted to turn said spindles, said hooks and said meat when said bar is partially rotated whereby said meat cooks first on one side and then on the other.

8. In combination with apparatus as set forth in claim 4, means for partially rotating said bar during said oscillation movement, and a plurality of spindles rotatable in said bar and projecting therebelow and having said hooks on their lower ends and other means adapted to turn said spindles, said hooks and said meat when said bar is partially rotated whereby said meat cooks first on one side and then on the other.

9. In combination with apparatus as set forth in claim 1, means for partially rotating said bar during said oscillation movement, and a plurality of spindles rotatable in said bar and projecting therebelow and having said hooks on their lower ends and rack and pinion means engaging during a portion of one direction of oscillation and adapted to turn said spindles, said hooks and said meat when said bar is partially rotated whereby said meat cooks first on one side and then on the other.

10. In combination with apparatus as set forth in claim 2, means for partially rotating said bar during said oscillation movement, and a plurality of spindles rotatable in said bar and projecting therebelow and having said hooks on their lower ends and rack and pinion means engaging during a portion of one direction of oscillation and adapted to turn said spindles, said hooks and said meat when said bar is partially rotated whereby said meat cooks first on one side and then on the other.

11. In combination with apparatus as set forth in claim 3, means for partially rotating said bar during said oscillation movement and a plurality of spindles rotatable in said bar and projecting therebelow and having said hooks on their lower ends and rack and pinion means engaging during a portion of one direction of oscillation and adapted to turn said spindles, said hooks and said meat when said bar is partially rotated whereby said meat cooks first on one side and then on the other.

12. In combination with apparatus as set forth in claim 4, means for partially rotating said bar during said oscillation movement and a plurality of spindles rotatable in said bar and projecting therebelow and having said hooks on their lower ends and rack and pinion means engaging during a portion of one direction of oscillation and adapted to turn said spindles, said hooks and said meat when said bar is partially rotated whereby said meat cooks first one one side and then on the other.

ALBERT C. MORRISSON.